United States Patent [19]

Clark

[11] 4,307,378

[45] Dec. 22, 1981

[54] FOUR-WIRE SPEED INDEPENDENT SELECTOR SWITCH FOR DIGITAL COMMUNICATION NETWORKS

[75] Inventor: Becky J. Clark, Tualatin, Oreg.

[73] Assignee: Burroughs Corporation, Detroit, Mich.

[21] Appl. No.: 104,965

[22] Filed: Dec. 18, 1979

[51] Int. Cl.$^3$ .......................... H04Q 9/00; H04J 6/00
[52] U.S. Cl. ........................ 340/825.01; 340/825.02; 340/825.52; 179/18 FG; 370/60; 370/94; 307/244
[58] Field of Search ........... 340/147 C, 166 R, 147 T, 340/147 LP; 179/18 AF, 18 AG, 18 AH, 15 A, 18 FD, 18 FG; 370/60, 94, 85, 91–93; 307/244, 232, 241, 208

[56] References Cited

U.S. PATENT DOCUMENTS

| | | | |
|---|---|---|---|
| 3,147,339 | 9/1964 | Silberg | 340/147 C |
| 3,633,163 | 1/1972 | Birchmeier | 340/147 C |
| 3,678,205 | 7/1972 | Cohen et al. | 340/147 C |
| 3,909,786 | 9/1975 | Lawrence | 340/147 C |

Primary Examiner—John W. Caldwell, Sr.
Assistant Examiner—Donnie L. Crosland
Attorney, Agent, or Firm—Mervyn L. Young; Kevin R. Peterson

[57] ABSTRACT

A speed independent selection switch designed for pipelined message transmission through digital communication networks. The selector routes a message from the input path to one of the two output paths selected by the first bit of the message, that designed bit then being discarded. Communication paths require four wires.

7 Claims, 10 Drawing Figures

FIG. 1
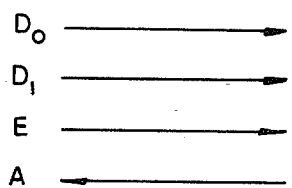
COMMUNICATION PATH
FIG. 2
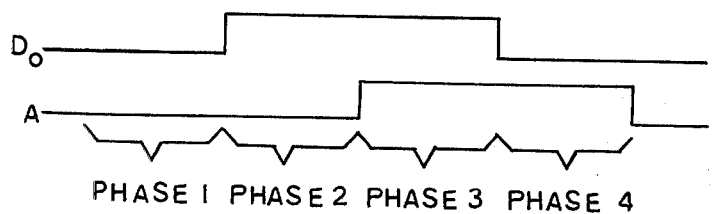
FOUR-PHASE CYCLE
FIG. 3
TRANSMISSION FORMAT
SENT: D • • • D D • • • D E E
DESTINATION   MESSAGE
ADDRESS
RECEIVED:   D • • • D E D • • • D E
MESSAGE   RETURN
ADDRESS

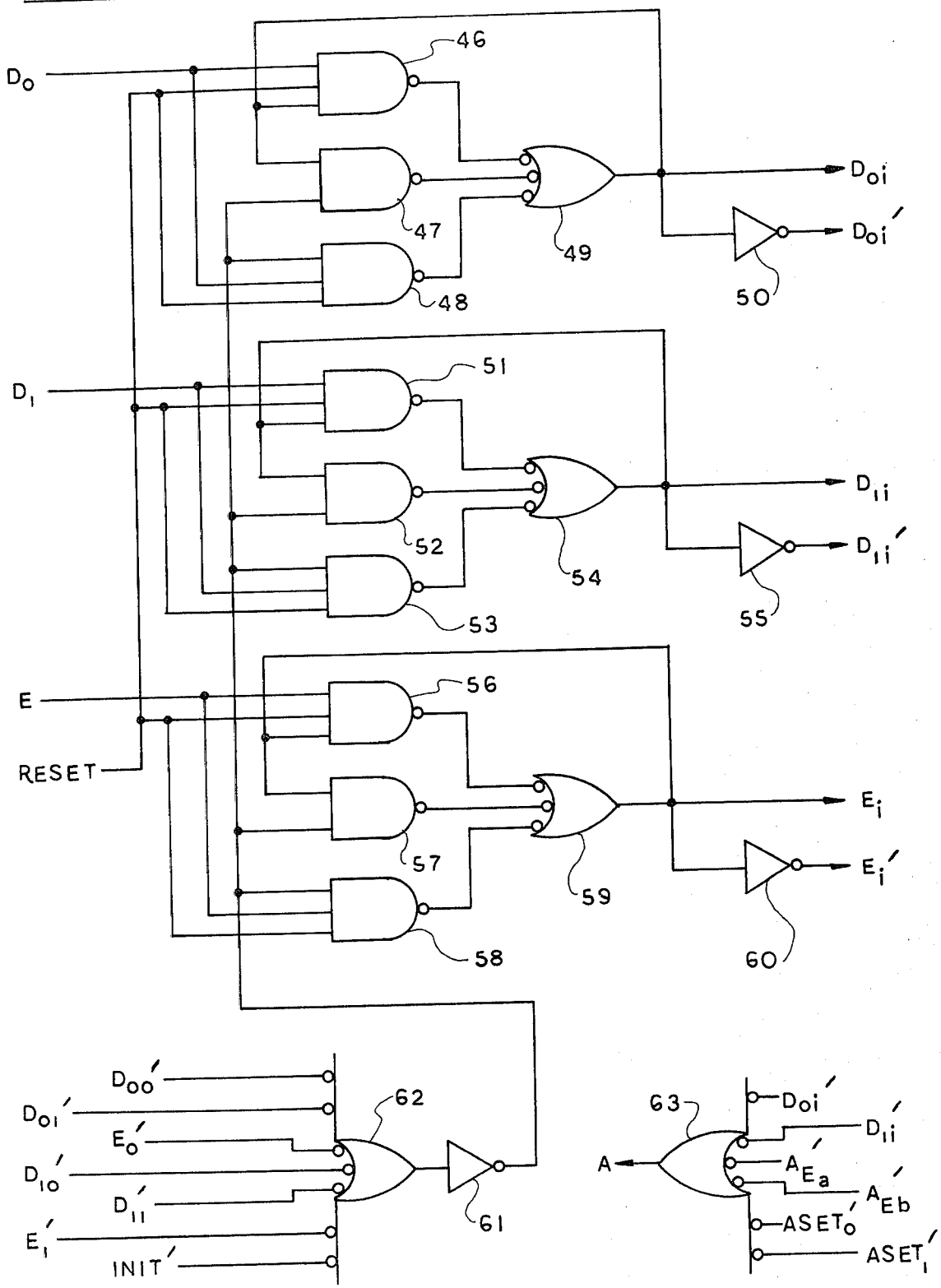
FIG. 7 INPUT QUEUE CELL

FOUR-WIRE SPEED INDEPENDENT SELECTOR SWITCH FOR DIGITAL COMMUNICATION NETWORKS

RELATED U.S. PATENT APPLICATIONS

U.S. patent applications directly or indirectly related to the subject application are the following:

Ser. No. 035,314 filed May 2, 1979 by Robert Stanley Barton and Becky Jane Clark and titled Digital Communication Networks Employing Speed Independent Switches;

Ser. No. 035,315 filed May 2, 1979 now U.S. Pat. No. 4,251,879 by Becky Jane Clark and titled Speed Independent Arbiter Switch for Digital Communication Networks;

Ser. No. 035,411 filed May 2, 1979 now U.S. Pat. No. 4,237,447 by Becky Jane Clark and titled Speed Independent Selector Switch for Digital Communication Networks; and Ser. No. 104,964 filed Dec. 18, 1979 by Becky Jane Clark and titled Four-Wire Speed Independent Arbiter Switch for Digital Communication Networks.

BACKGROUND OF THE INVENTION

1. Field of the Invention

This invention pertains to networks of digital devices with shared components, which networks in turn may share components at a higher level. The interconnections are constructed from two kinds of speed independent switches called arbiters and selectors.

Communication in networks connected by arbiter and selector switches is in the form of serially transmitted messages which in the general case consist of three parts: destination address, body, and source address. The source address originates on the path where it is determined by the arbiter switches from the destination to the source. The destination address selects the path through the network to the destination and is used bit-by-bit in the selector switches along that path. In general, as a message moves through a network, an arbiter appends a bit to indicate through which of its two inputs a message entered and a selector removes the leading bit and selects through which of its two outputs the message leaves. A receiving device accepts first the message body and then the source address.

A speed independent selector has been described in the above referred-to Clark patent application Ser. No. 035,411, and networks in which it may be employed have been described in the above referred-to Barton et al patent application Ser. No. 035,314. The selector described in the present application constitutes an improvement over that described in Ser. No. 035,411.

It is an object of the present invention to provide an improved speed independent selection switch for digital communication networks requiring fewer wires per communication path.

It is another object of the present invention to provide a selector switch which allows clearing of a communication path from the sender towards the receiver as soon as the message has traversed the switch.

It is another object of the present invention to provide a selector switch with a simpler communication protocol.

2. Summary of the Invention

The present invention is a speed independent selection switch designed for pipelined message transmission through digital communication networks. The selector routes a message from the input path to one of two output paths selected by the first bit of the message, that bit then being discarded.

The communication paths each use four wires, three of which are used in a 1-out-of-3 code and the fourth of which acknowledges receipt of a character.

Trees formed from selectors provde distribution to two or more devices from one source.

Networks employing both selectors and arbiters can be formed for the transmission of messages among a number of devices.

BRIEF DESCRIPTION OF THE DRAWINGS

The above and other objects, advantages and features of the present invention will become more readily apparent from a review of the following specifications when taken in conjunction with the drawings wherein:

FIG. 1 is a diagram of a communication path;

FIG. 2 is a timing diagram of a four-phase cycle;

FIG. 3 is a diagram of transmission format;

FIGS. 6-9 are schematic diagrams of the selector switch.

GENERAL DESCRIPTION OF THE INVENTION

Figure 4:
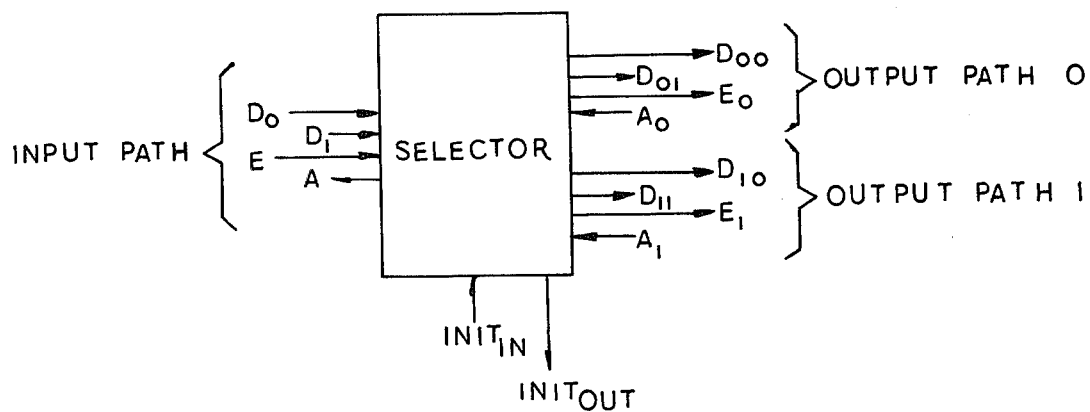
FIG. 4 is a diagram of a selector switch.

The selector of the present invention is used together with the arbiter of the Clark patent application Ser. No. 035,315, and in the networks of the Barton et al patent application Ser. No. 035,314. The communication paths of both the selector and arbiter require four wires for each path as shown in FIG. 1. Three of the lines, $D_0$, $D_1$, and E, are used in a 1-out-of-3 code, and a one on any of these lines is referred to as a character. At any given time, either all three will be in the dormant or zero state or exactly one will be in the active or one state. The fourth line A is used in a four-phase cycle with each of the first three lines individually to indicate that the data sent on $D_0$, $D_1$, or E has been received or cleared. The four phases of the cycle are shown in FIG. 2 with $D_0$ and A. In the first or dormant phase all four lines are zero. When A is zero one of the other three lines may change to one. In the second phase $D_0$ has changed to one indicating that a zero is being sent. A will then change to one initiating the third phase and indicating that the data has been received and the sender may clear $D_0$. In the fourth phase $D_0$ has returned to zero, and when A returns to zero, the first or dormant phase is entered again.

$D_0$ and $D_1$ are used to send message and address bits with zeroes transmitted on $D_0$ and ones on $D_1$, and E is used to terminate the message and the return address. The format for a transmission is some number (possibly zero) of zeroes and ones constituting the address through the selectors of the network and the message followed by E terminating the message followed by some number (possibly zero) of zeroes and ones constituting the return address followed by E terminating the return address and the transmission. The first character of a transmission traversing a selector must be a zero or a one and will be removed and used to set the output path of the selector. A transmission traversing an arbiter will have a return address character inserted after the first E indicating the input path in use for the transmission. The characters of the return address will be received in the order required to send a return transmission.

An empty message may be sent through a network of arbiters, and an empty return address may be received from a network of selectors. Upon input to a network, a transmission will normally consist of the destination address (if any), the message, and two Es (since the return address will be generated by the network). The transmission received from a network will normally consist of the message, E, the return address (if any), and E. These formats are shown in FIG. 3.

The second E of a transmission will cause a switch to clear. In the case of the selector this means that the next bit received on the input will select the output path for the following transmission. In the case of the arbiter the next transmission to arrive at one of the inputs will be allowed through. If transmissions arrive on both inputs simultaneously, the conflict will be resolved by an arbitration circuit inside of the arbiter and one will be allowed through. Whenever a transmission through one input clears, a message waiting on the other input will be allowed through. Thus, under heavy loading conditions, the arbiter will alternate between the two input paths.

DESCRIPTION OF THE SELECTOR SWITCH

The selector switch is shown in FIGS. 4-9. FIG. 4 shows the edternal connections. The input communication path consists of inputs $D_0$, $D_1$, and E and output A. The output path selected by a zero consists of outputs $D_{00}$, $D_{01}$, and $E_0$ and input $A_0$. The output path selected by a one consists of outputs $D_{10}$, $D_{11}$, and $E_1$ and input $A_1$. In addition to the communication paths there is an initialization signal $Init_{in}$ which resets the selector to the initial state and is used when power to the circuit is turned on. $Init_{in}$ is buffered to produce $Init_{out}$ for cascading of switches.

Figure 5:
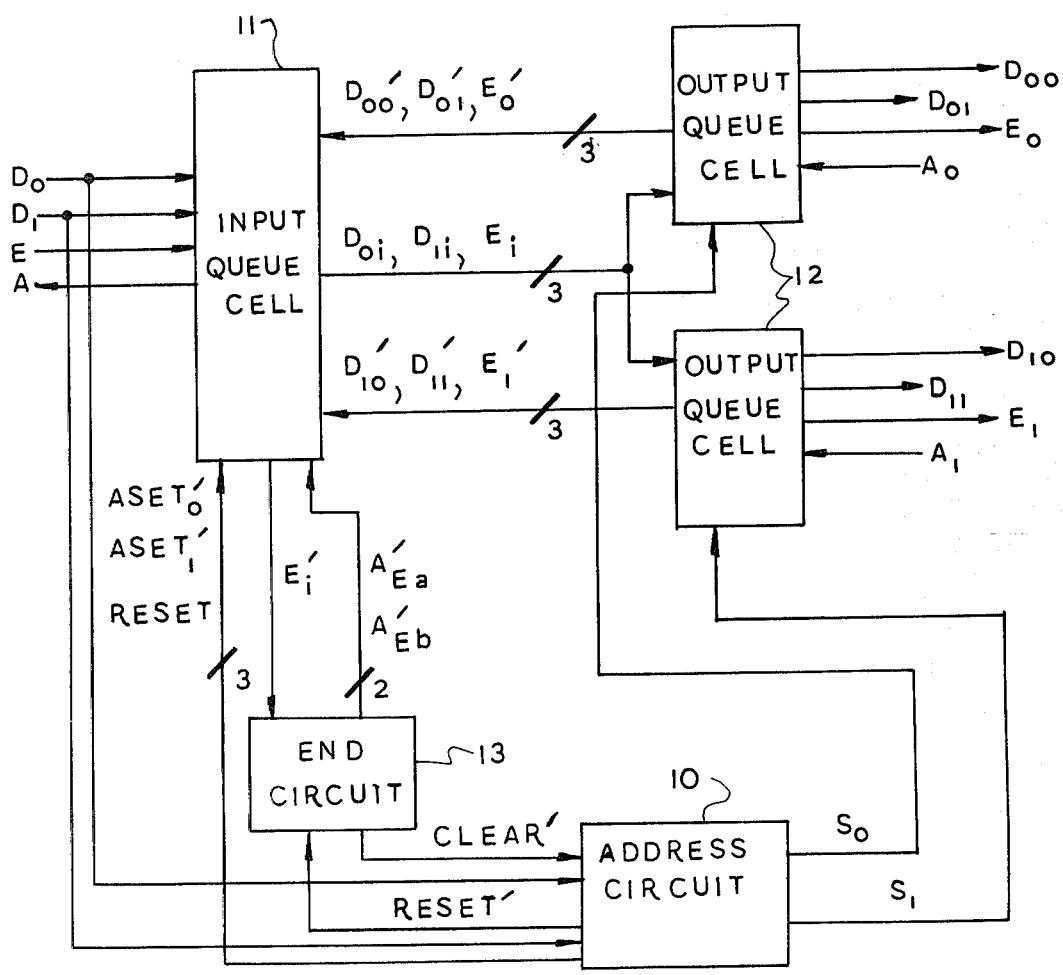
FIG. 5 is a block diagram of the parts of a selector switch.

The block diagram for the selector is shown in FIG. 5. Address circuit 10 removes the first bit of a transmission and selects the output path accordingly. The input queue cell 11 is the first stage of a one-character queue used for pipelining the signals received on $D_0$, $D_1$ and E. The two output queue cells 12 form the second stage of the one-character queue. One of the output queue cells is selected by address circuit 10 for each transmission. End circuit 13 detects the second E of a transmission indicating the end of the return address and the transmission and causes address circuit 10 to be reset to the clear state.

Figure 6:
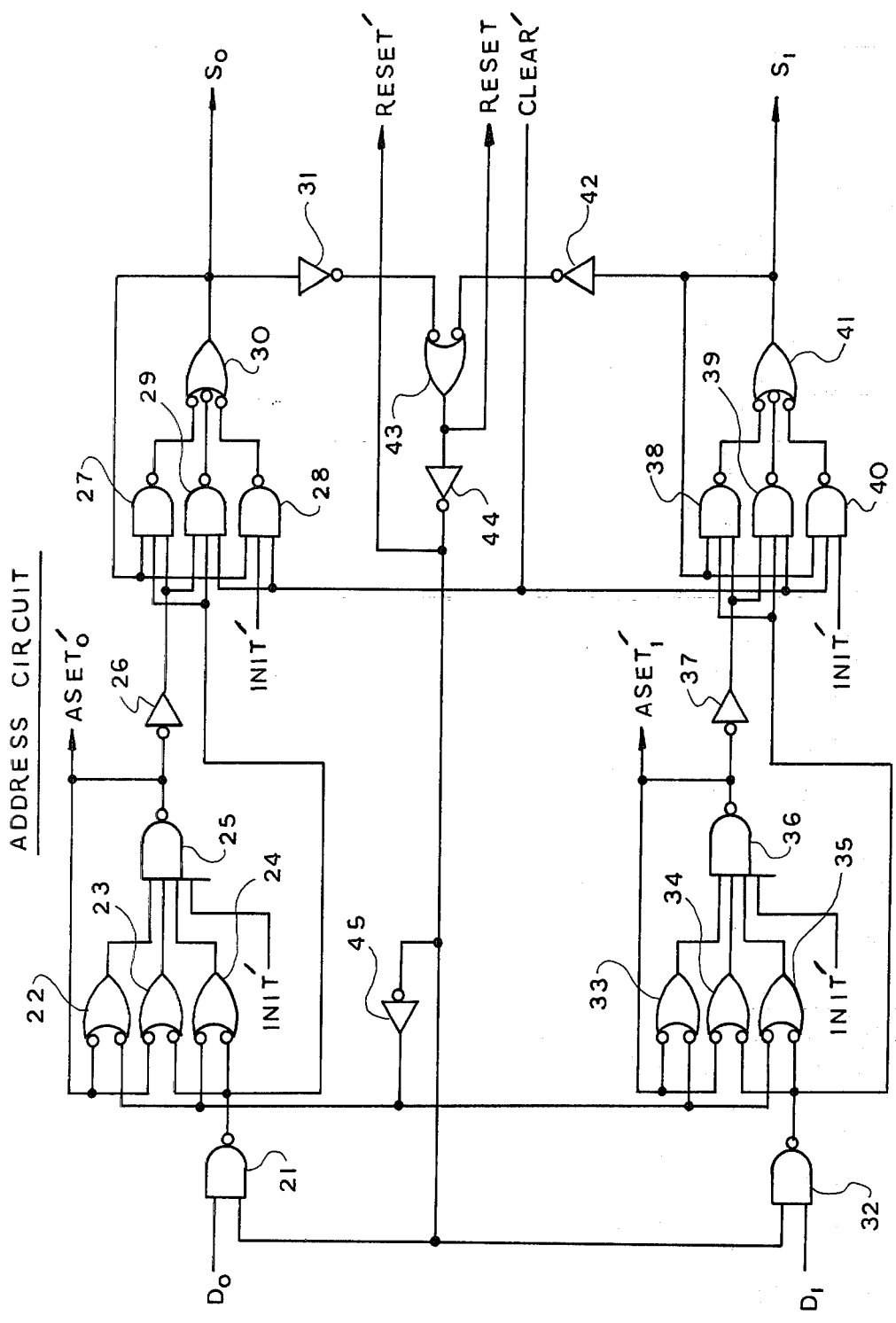

Address circuit 10 of FIG. 5 is shown in detail in FIG. 6. It consists of two similar circuits used to set the selector to the zero path (gates 21-31) or the one path (gates 32-42) and several gates used in common by the two circuits (gates 43-45). A number of groups of gates in the selector may be viewed as implementations of the consensus or C-element or variations of a C-element which have similar timing characteristics. In FIG. 6 these groups are gates 22-25, 27-30, 33-36, and 38-41. Initially $Aset_0'$ and $Aset_1'$ will be one, $S_0$ and $S_1$ will be zero, and Clear' will be one. When $D_0$ changes to one, the output of gate 21 will change to zero, and $Aset_0'$ will become zero. When $D_0$ returns to zero, $S_0$ becomes one, Reset becomes one, and $Aset_0'$ returns to one. Further signals on $D_0$ and $D_1$ will be blocked by gates 21 and 32. $S_0$ will remain one until the end of the transmission when Clear' changes to zero. When $S_0$ and $S_1$ are both zero, the address circuit is clear, Reset becomes zero, Reset' becomes one, and the next data signal on $D_0$ and $D_1$ will be allowed into the circuit through gate 21 or 32. The operation of gates 32-42 is similar to the operation of gates 21-31 just described.

The input queue cell 11 of FIG. 5 is shown in detail in FIG. 7. There are three similar circuits consisting of gates 46-50, 51-55, and 56-60, each of which is a modified C-element with an inverter, and gates 61-63 used to detect presence of data in the queue cells or address circuit. When the first bit of data in a transmission has just been received, $Aset_0'$ or $Aset_1'$ will become zero causing A to change to one acknowledging that address bit. When the data has been removed, Reset will change to one, and $Aset_0'$ or $Aset_1'$ will return to one. When gate 61 is one indicating that the output queue cell is empty, the next signal on $D_0$, $D_1$, or E will cause $D_{0i}$, $D_{1i}$, or $E_i$, respectively, to change to one, and the input queue cell will then be considered full. $D_{0i}'$, $D_{1i}'$ or $E_i'$ will change to zero causing a one on A. When the stored data has been received by the selected output queue cell, gate 62 will change to one, and gate 61 will become zero. When the signal on $D_0$, $D_1$, or E has returned to zero and gate 61 is zero, the signal on $D_{0i}$, $D_{1i}$, or $E_i$ will return to zero, emptying the input queue cell and causing the acknowledge A to return to zero. This cycle will be repeated for each succeeding character in the transmission.

Figure 8A:
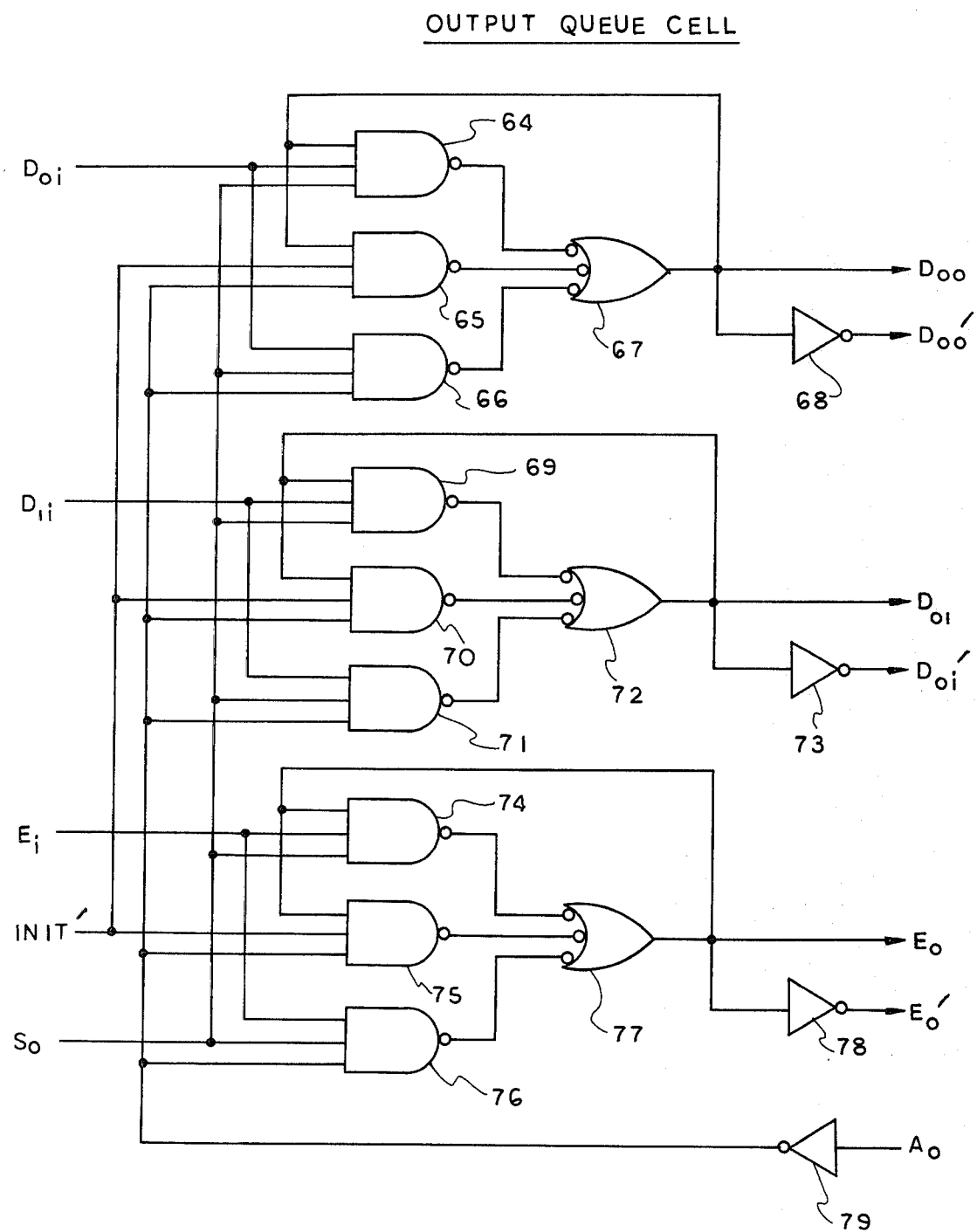
Figure 8B:
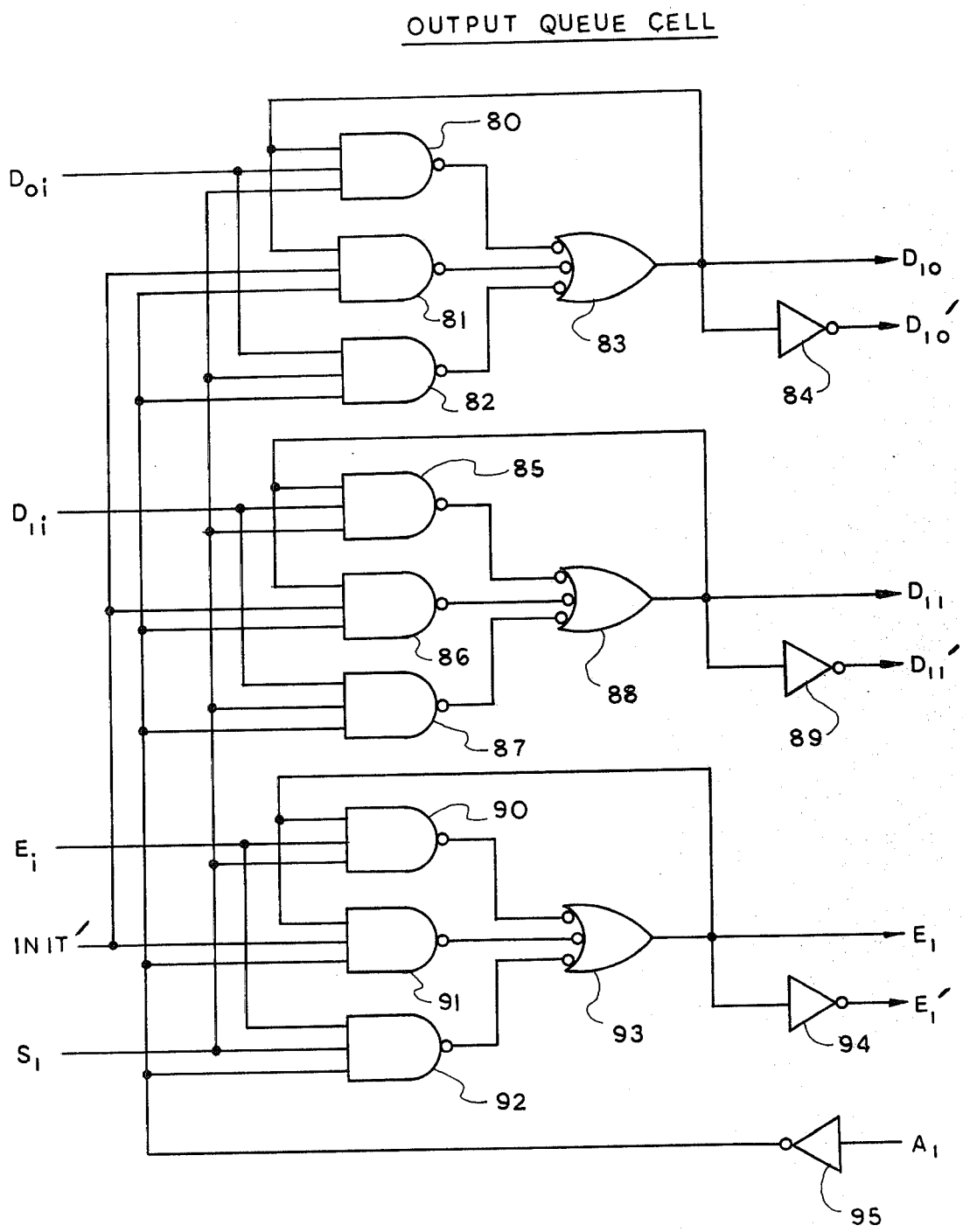

The output queue cells 12 of FIG. 5 are shown in detail in FIG. 8. When the first character of a transmission has set the address circuit, one of the two queue cells consisting of gates 64-79 and gates 80-95 will be selected by $S_0$ or $S_1$. The queue cell for the zero path, gates 64-79, consists of three similar circuits, gates 64-68, 69-73, and 74-78, used to store signals on $D_{0i}$, $D_{1i}$, and $E_i$ respectively, and an inverter for acknowledge $A_0$. When the zero path has been selected by a one on $S_0$ and gate 79 is one indicating that data may be placed on the output path, a signal change to one on $D_{0i}$, $D_{1i}$, or $E_i$ will cause $D_{00}$, $D_{01}$, or $E_0$, respectively, to change to one. $D_{00}'$, $D_{01}'$, or $E_0'$ will change to zero, indicating to the input queue cell that the output queue cell is full. When the input signal on $D_{0i}$, $D_{1i}$, or $E_i$ returns to zero and gate 79 changes to zero indicating that the output data on $D_{00}$, $D_{01}$, or $E_0$ has been received, $D_{00}$, $D_{01}$, or $E_0$ will return to zero. This cycle will be repeated for each succeeding character in the transmission. Operation of the one path output queue cell is analogous to the operation of the zero path output queue cell just described.

Figure 9:
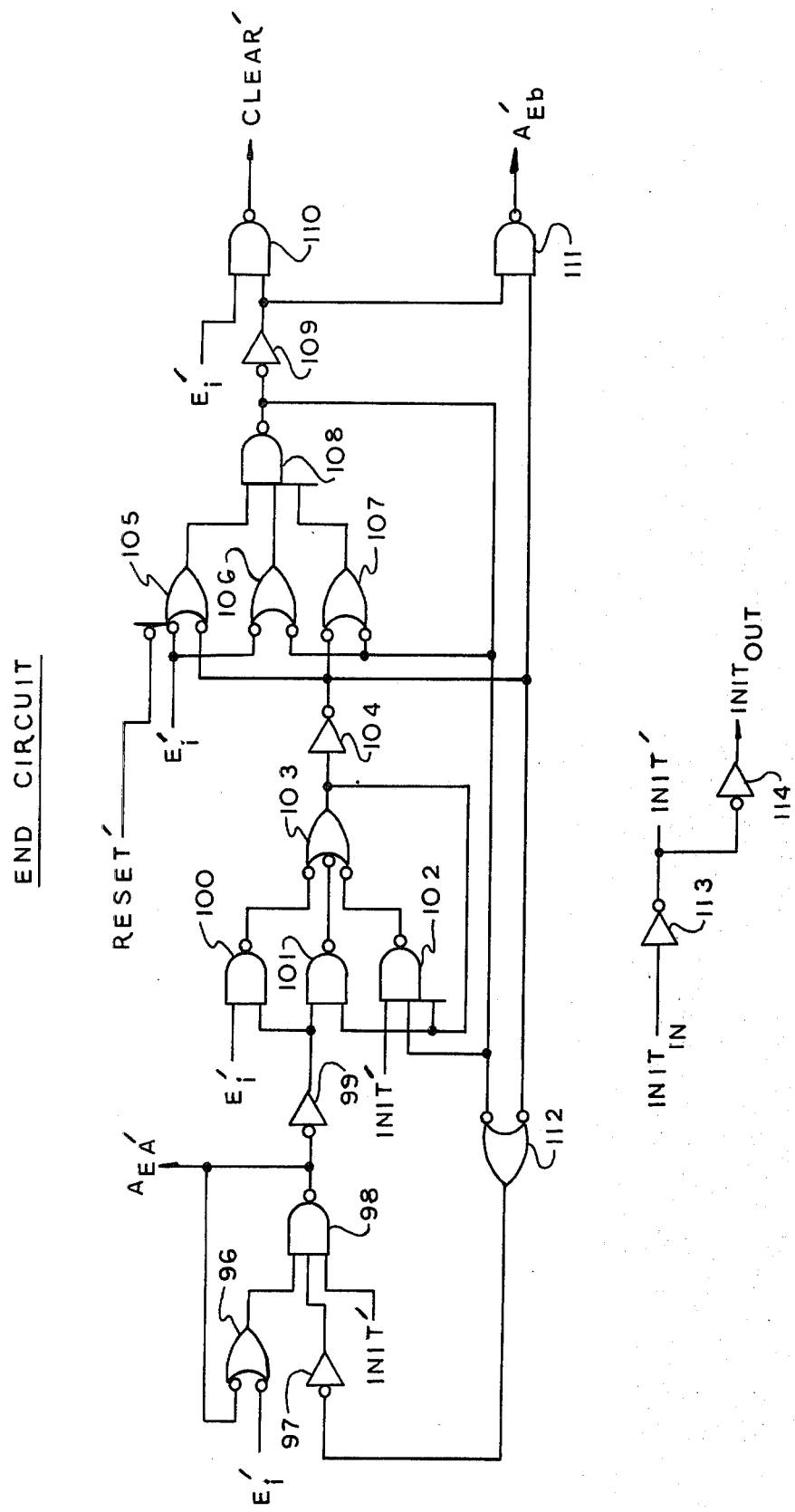

End circuit 13 of FIG. 5 is shown in detail in FIG. 9. It consists of C-elements 96-98, 100-103, and 105-108 and several other gates. Initially gate 112 will be zero, and a change from one to zero on $E_i'$ from the input queue cell will cause $A_{Ea}'$ to change to zero acknowledging the first E in the transmission. When $E_i'$ changes to one, gate 103 will change to one, gate 104 will change to zero, gate 112 will change to one, and $A_{Ea}'$ will become one. When $E_i'$ again changes to zero, gate 108 will change to zero, and gate 109 will change to one. C-element 100-103 will also change to zero with gate 104 changing to one, and gate 111 changing to zero to acknowledge the second E of the transmission. When $E_i'$ returns to one, Clear' will change to zero causing the address circuit to clear. When the address circuit is clear, Reset' will change to one, C-element 105-108 will change to one, gate 109 to zero, and gate 111 to one removing the acknowledge on $A_{Eb}'$. Gate 110 will change to one to remove the Clear' signal to the address circuit, and gate 112 will change to zero allowing the cycle to be repeated for the next transmission.

Initialization of the selector switch is accomplished by setting the $Init_{in}$ signal to one for a sufficient period of time and then changing it to zero for normal operation. $Init_{in}$ is buffered to produce $Init_{out}$.

EPILOGUE

As described above, the present invention is a speed independent selection switch employing four-wire communication paths for pipelined message transmission through digital communication networks.

While but one embodiment of the present invention has been disclosed, it will be obvious to those skilled in the art that variations and modifications may be made therein without departing from the spirit of the scope of the invention as claimed.

What is claimed is:

1. A selection switch for receiving sets of data signals from a node of a digital communication network and transmitting those signals to one of two other nodes, said switch comprising:
   input queue means and a pair of output queue means, said input queue means being adapted to receive said sets of said data signals;
   an address circuit to receive said sets of data signals preceded by an address signal specifying which one of said pair of output queue means is to be selected for subsequent transmission and to signal the corresponding one of said output queue means; and
   end circuit means to detect the end of data transmission and clear the switch for subsequent transmission.

2. A selection switch according to claim 1, wherein:
   said address circuit includes means to remove the first address bit of the address upon selection of one of the pair of output queue means.

3. A selection switch according to claim 2, wherein: said input queue means and each of the output queue means form two-stage queues, such that a data bit in the input queue means is transferred to the corresponding output queue means only when the output queue means is empty.

4. A selection switch according to claim 3, wherein:
   the output queue means of said two stage queues receive data signals for transmission to said other nodes.

5. A selection switch for receiving sets of data signals from a node of a digital communication network and transmitting those signals to one of two other nodes, said switch comprising:
   an input queue means and a pair of output queue means, said input queue means being adapted to receive said sets of said data signals;
   an address circuit to receive said sets of data signals preceded by an address signal specifying which of two nodes is to be selected for subsequent transmission and to signal the corresponding one of said output queue means;
   said address circuit including means to remove the first address bit of the address upon selection of one of the pair of switch circuits; and
   end circuit means to detect the end of data transmission and clear the switch for subsequent transmission.

6. A selection switch according to claim 5, wherein:
   said input queue means and said pair of output queue means form two-stage character queues to receive a data bit in the input queue and transfer that bit to the corresponding output queue means only when that output queue means is empty, thereby enabling pipelining through the connected nodes of the network.

7. A selection switch according to claim 5, wherein:
   the output queue means of said two stage queues receive data signals for transmission to said other nodes.

* * * * *